United States Patent [19]

Shinoda et al.

[11] Patent Number: 5,031,985
[45] Date of Patent: Jul. 16, 1991

[54] OPTICAL SWITCH SYSTEM AND APPARATUS

[75] Inventors: Takahisa Shinoda; Yasuaki Nakamura, both of Shizuoka, Japan

[73] Assignee: Koito Manufacturing Co., Ltd., Tokyo, Japan

[21] Appl. No.: 450,197

[22] Filed: Dec. 13, 1989

[30] Foreign Application Priority Data

Dec. 14, 1988 [JP] Japan .................................. 63-315936
Nov. 10, 1989 [JP] Japan .................................. 1-291105

[51] Int. Cl.$^5$ .............................................. G02B 6/26
[52] U.S. Cl. .............................. 350/96.15; 350/96.24; 350/315; 350/317; 250/227.21; 250/227.22; 250/227.28
[58] Field of Search .................. 350/96.15, 96.24, 315, 350/317, 318, 273, 274, 166; 250/227.21, 227.22, 227.28

[56] References Cited

U.S. PATENT DOCUMENTS

| | | | |
|---|---|---|---|
| 4,315,691 | 2/1982 | Perkins et al. | 350/315 X |
| 4,800,266 | 1/1989 | Poorman | 250/227.21 X |
| 4,897,542 | 1/1990 | Dakin et al. | 250/227.21 |

*Primary Examiner*—Frank Gonzalez
*Assistant Examiner*—Stephen W. Barns
*Attorney, Agent, or Firm*—Sughrue, Mion, Zinn, Macpeak & Seas

[57] ABSTRACT

An optical switch system including an optical switch apparatus which includes a light source emitting light of a certain wavelength, a single optical fiber cable for transmitting the light to a terminal switch, radiating means for radiating the light transmitted over the optical fiber cable, a reflector that is provided in the optical path of the radiated light at such a position that the reflected light will reach the radiating means, a shutter adapted to be inserted into or removed from the optical path of the radiated light, and a light extractor for detecting the reflected light wave that has passed through a return path in the optical fiber cable.

14 Claims, 7 Drawing Sheets

5,031,985

OPTICAL SWITCH SYSTEM AND APPARATUS

BACKGROUND OF THE INVENTION

The present invention relates to an optical switch system and apparatus for use in controlling the operations of retracting or extending a stairway (gangway) from an aircraft or opening or closing power windows of a motor vehicle.

Recently, large aircraft have been designed so that passengers can have direct access thereto from a jetway. On the other hand, smaller aircraft mainly intended to fly in and out of small local airports are generally equipped with a retractable stairway in the cabin thereof that can be extended to provide access for passengers. The mechanism for extending the stairway down to the ground or retracting it, to be accommodated in the cabin, is operated by hydraulic pressure, for example, with many pipes harnessed to the frame of the aircraft. However, such hydraulic pipes are cumbersome to handle. Instead, therefore, an electric signal has been conventionally used for controlling the operation of the stairway. In order to achieve the control by the electric signal, the necessary number of cables must be laid and provided with associated control switches. A similar approach is taken for operating power windows of a vehicle. However, because of the great number of wires that have to be harnessed, the method described above suffers from problems as to the difficulty involved in installation work and obtrusiveness of the wire harness. Further, such a conventional method with the cluttered wires may cause another problem that an erroneous operation is liable to occur particularly in an environment that is subject to heavy electromagnetic interference.

To avoid the above problems, an optical fiber cable may be used. However, in this case, it is necessary to install a light source at the operating site and, as a result, accompanying wire harnesses are still required for supplying power to the light source. Thus, the problem of limiting in the number of wires has not conventionally been sufficiently solved by employing an optical fiber cable.

SUMMARY OF THE INVENTION

Accordingly, an object of the present invention is to eliminate the above-described problems of the conventional switch apparatus. That is, an object of the present invention is to provide an optical switch system and apparatus capable of reducing the number of wires to be harnessed.

Further, it is another object of the invention to provide an optical switch system and apparatus simple in construction and for which the number of steps involved in installation work is reduced, thereby lowering the chance of error in the installation work.

The foregoing and other objects can be achieved by the provision of an optical switch system including an optical switch apparatus which, according to the present invention, comprises a light source emitting light of a certain wavelength, a single optical fiber cable for transmitting the light to a terminal switch, radiating means for radiating the light transmitted over the optical fiber cable, a reflector provided in the optical path of the radiated light at such a position that the reflected light will reach the radiating means, a shutter adapted to be inserted into or removed from the optical path of the radiated light, and a light extractor for detecting the reflected light that has passed through a return path in said optical fiber cable.

According to the present invention, the type of light to be reflected varies by changing the position of the shutter, so that the operator only need monitor the type of reflected light in order to identify the operational position of the switch. Further, at least one type of light is always reflected, and hence an abnormality can be identified merely by detecting the presence of absence of light.

DETAILED DESCRIPTION OF THE PREFERRED EMBODIMENTS

Figure 1:
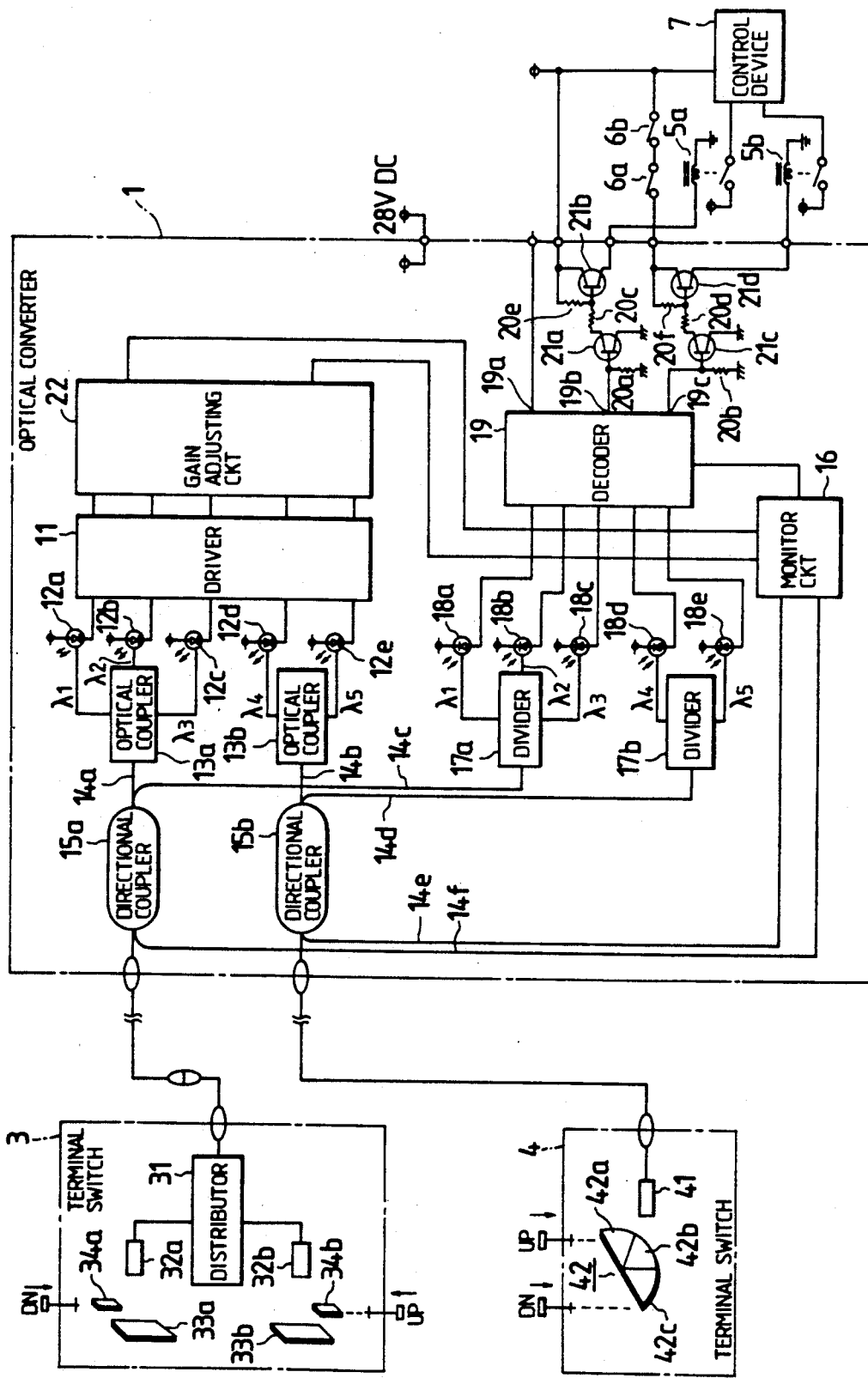
FIG. 1 is a circuit diagram of an optical system to which optical switch apparatuses of first and third embodiments of the present invention are applied.

FIG. 1 is a circuit diagram of an optical system to which optical switch apparatuses of first and second embodiments of the present invention are applied.

As shown in FIG. 1, the system includes an optical converter 1 for transmitting light and detecting the same, a terminal switch 3 which is operated by an operator to perform control over the retraction or extension of the stairway of an aircraft, and a terminal switch 4 which is operated by an operator to perform control over the retraction or extension of the stairway. The terminal switch 3 corresponds to a first embodiment of the present invention, whereas terminal switch 4 corresponds to a second embodiment.

In the optical converter 1, light-emitting diodes 12a–12e are driven by a driver 11 to emit light at respective different wavelengths λ1 to λ5. The light having wavelengths λ1 to λ3 is supplied to an optical coupler 13a, whereas the light having wavelengths λ4 and λ5 is supplied to an optical coupler 13b. The light supplied to the optical coupler 13a is transmitted over an optical fiber cable 14a, and the light supplied to the optical coupler 13b is transmitted over an optical fiber cable 14b. Directional couplers 15a and 15b are disposed in the path of the optical fiber cables 14a and 14b, respectively, for extracting independently the advancing light and the reflected light. The extracted light part of the advancing light is detected by a monitor circuit 16, and an output of the monitor circuit is supplied to a gain adjusting circuit 22 to control light-emitting diodes 12a-12e in such a way that they emit a constant intensity of light.

The light transmitted over the optical fiber cable 14a is divided into two beams by a distributor 31 provided in the terminal switch 3 and the beams are launched into lenses 32a and 32b which serve as light converging means. That is, the light transmitted over the optical fiber cable 14a is converged by these lenses and radiated therefrom. At the same time, these lenses converge the reflected light and supply it into the optical fiber cable 14a. Thus, a single optical fiber cable of the invention transmits light in two directions, that is, advancing and reflected light beams.

The light radiated from the lens 32a is supplied to a stationary filter 33a. A movable filter 34a is provided between the filter 33a and the lens 32a. The filter 34a can be inserted into the optical path of the light to block it or it can be removed from the optical path as required. The stationary filter 33a is adapted to reflect light in such a way that it returns effectively to the lens 32a. The filter 34a is installed at such an angle that when it is inserted into the optical path of the light of interest at a position where it blocks the light, the reflected light will return effectively to the lens 32a. A similar positional relationship is satisfied by lens 32b and stationary filter 33b and movable filter 34b.

The reflectors described above are so designed that they pass light of certain wavelengths, but reflect light of the other wavelengths, as shown below in Table 1.

TABLE 1

| Filter | Wavelength of passed light | Wavelength of reflected light |
|---|---|---|
| 33a | λ1, λ3 | λ2 |
| 34a | λ3 | λ1, λ2 |
| 33b | λ1, λ3 | λ2 |
| 34b | λ1 | λ2, λ3 |

Figure 2:
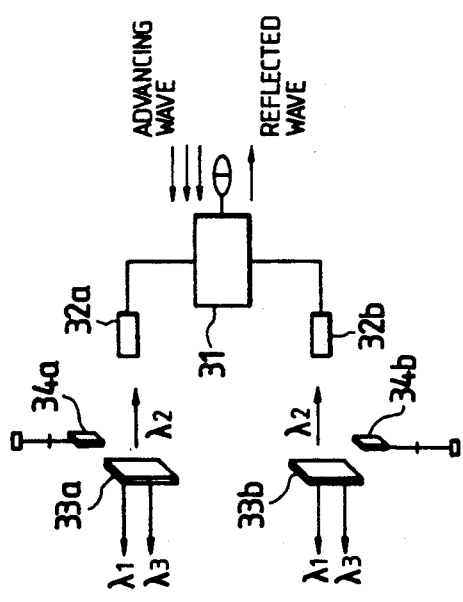

If both filters 34a and 34b are removed from the optical path as shown in FIG. 2, the light having wavelengths of λ1 to λ3 that is radiated from the lens 32a reaches the filter 33a, through which light having wavelengths of λ1 and λ3 is passed. On the other hand, light having a wavelength of λ2 is reflected by the filter 33a, converged by the lens 32a, and then launched into the optical fiber cable 14a through the distributor 31. The lens 32b and filters 33b such that 34b operate in a similar way and only light having a wavelength of λ2 is supplied to the optical fiber cable 14a.

In the case shown in FIG. 2, light having a wavelength of λ2 is reflected by both filters 33a and 33b, and the reflected beams are combined together in the distributor 31. If the two signals are the same in phase, they are added to each other, thereby producing an amplitude twice the amplitude of either signal.

Figure 3:
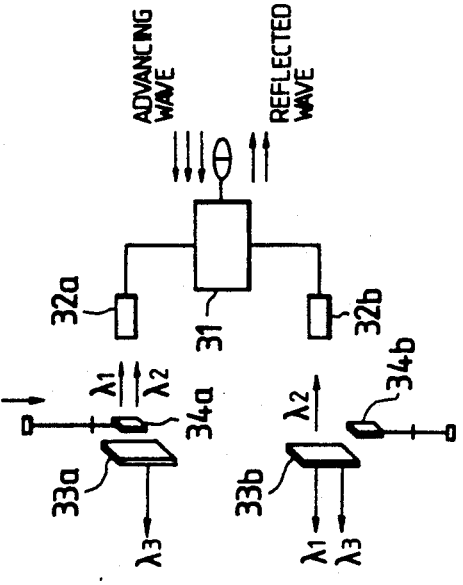
FIGS. 2 to 5 show operational conditions of filters according to the first embodiment.

If only the filter 34a is inserted into the optical path as shown in FIG. 3, light having wavelengths of λ1 and λ2 is reflected by that reflector, and thus reflected light having wavelengths of λ1 and λ2 is launched into the optical fiber cable 14a.

Figure 5:
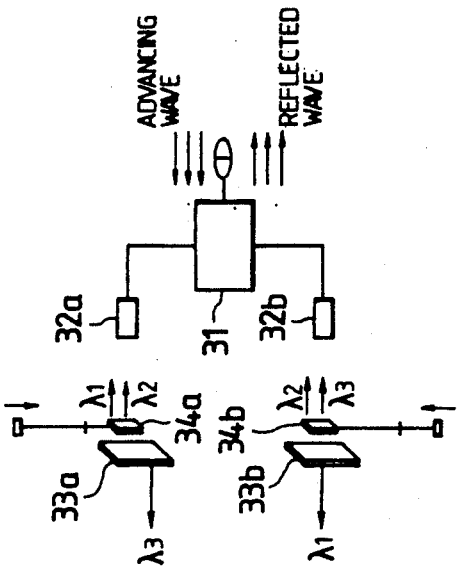
Figure 4:
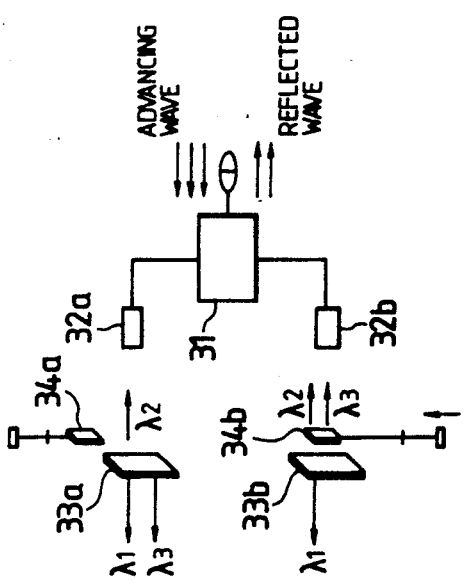

Similarly, if only the stationary filter 34b is inserted into the optical path as shown in FIG. 4, light having wavelengths of λ2 and λ3 is reflected and launched into the optical fiber cable 14a. If both filters 34a and 34b are inserted into the optical path as shown in FIG. 5, light having wavelengths λ1 to λ3 is launched into the optical fiber cable 14a through the distributor 31.

In the cases shown in FIGS. 3 and 4, light having wavelengths λ1 and λ3 is reflected by only one reflector, whereas light having wavelength λ2 is reflected by both reflectors, so that the amplitude of the light having the wavelength λ1 or λ3 is one half the amplitude of the light having the wavelength λ2.

The reflected light supplied into the optical fiber cable 14a is extracted by directional coupler 15a and divided by divider 17a into separate beams according to wavelength, which beams are then supplied for detection by light-receiving diodes 18a to 18c. The resulting detection outputs are supplied to a decoder 19 which decodes the signals corresponding to the input wavelengths and produces outputs representing a specific condition of the terminal switch 3 as shown in Table 2.

TABLE 2

| Wavelength detected | Filter 34a | Filter 34b |
|---|---|---|
| λ2 | removed from the optical path | removed from the optical path |
| λ1 + λ2 | inserted into the optical path | removed from the optical path |
| λ2 + λ3 | removed from the optical path | inserted into the optical path |
| λ1 + λ2 + λ3 | inserted into the optical path | inserted into the optical path |
| —— + λ2 | failure | ══ |
| —— + λ2 | ══ | failure |
| none | failure | failure |

Underlining in Table 2 means that the relevant light has an amplitude one half the amplitude of light having wavelengths not underlined. Single bars " " mean that any wavelength will suffice, and double bars " " mean that no consideration was given to the relevant reflector.

Figure 6:
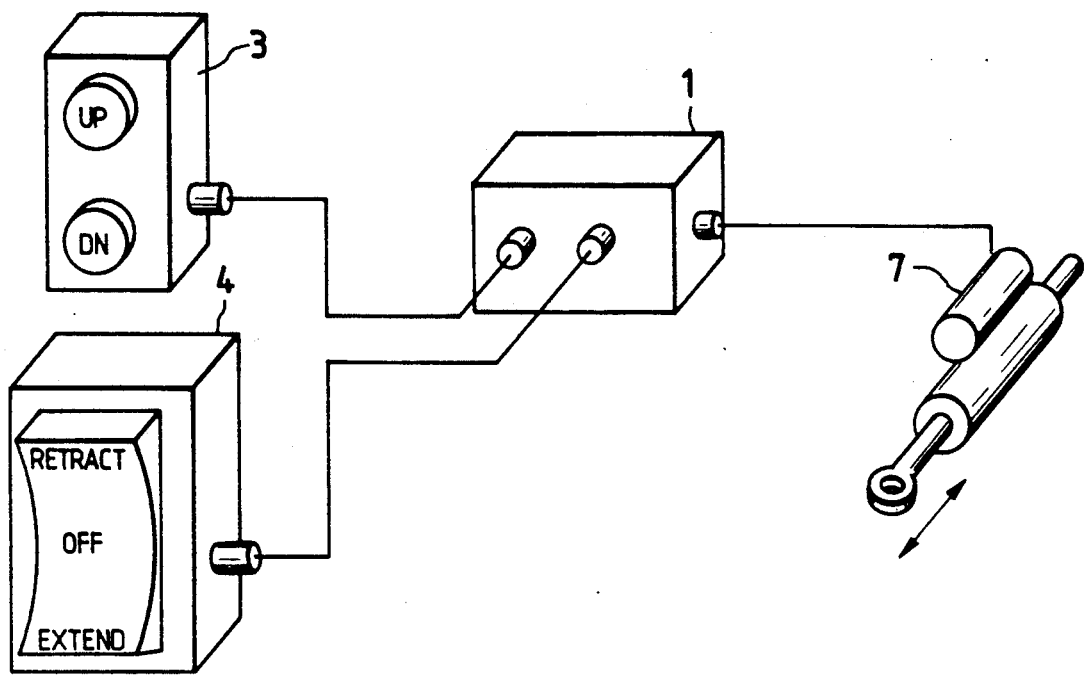
FIG. 6 is a diagram showing the overall construction of the switch system apparatus shown in FIG. 1.

FIG. 6 is a diagram showing the overall construction of the switch system apparatus shown in FIG. 1. Filters 34a and 34b in terminal switch 3 correspond to the buttons marked with "UP" and "DN", respectively, of a switch apparatus 3' in FIG. 6. Reflector unit 42 in the terminal switch 4 (described below in detail) corresponds to a switch marked "RETRACT" and "EXTEND" of a switch apparatus 4' in FIG. 6. That is, the switch apparatus 3' is arranged in accordance with a first embodiment of the invention, whereas the switch apparatus 4' is arranged in accordance with a second embodiment of the invention.

Figure 7A:
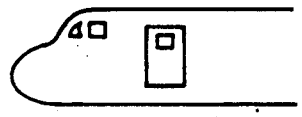
FIGS. 7A and 7B show an aircraft where a stairway is retracted into the cabin and FIG. 7A shows the stairway extended to the ground.
Figure 7B:
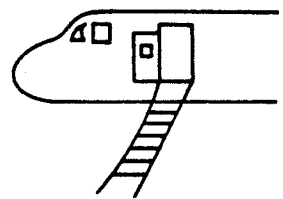

When either the RETRACT or EXTEND side of the switch apparatus 4' is depressed or the UP or DN button of the switch apparatus 3' is pushed, the shaft of a control device 7 moves accordingly to cause the stairway to be retracted into the cabin of an aircraft, as shown in FIG. 7A, or extended to the ground, as shown in FIG. 7B.

A terminal switch according to a second embodiment of the present invention is hereunder described with reference to FIGS. 8–14. The circuit configuration of the second embodiment is basically the same as that of the first embodiment shown in FIG. 1, and hence the following description will concern only the essential part, i.e., terminal switch 103.

Figure 10:
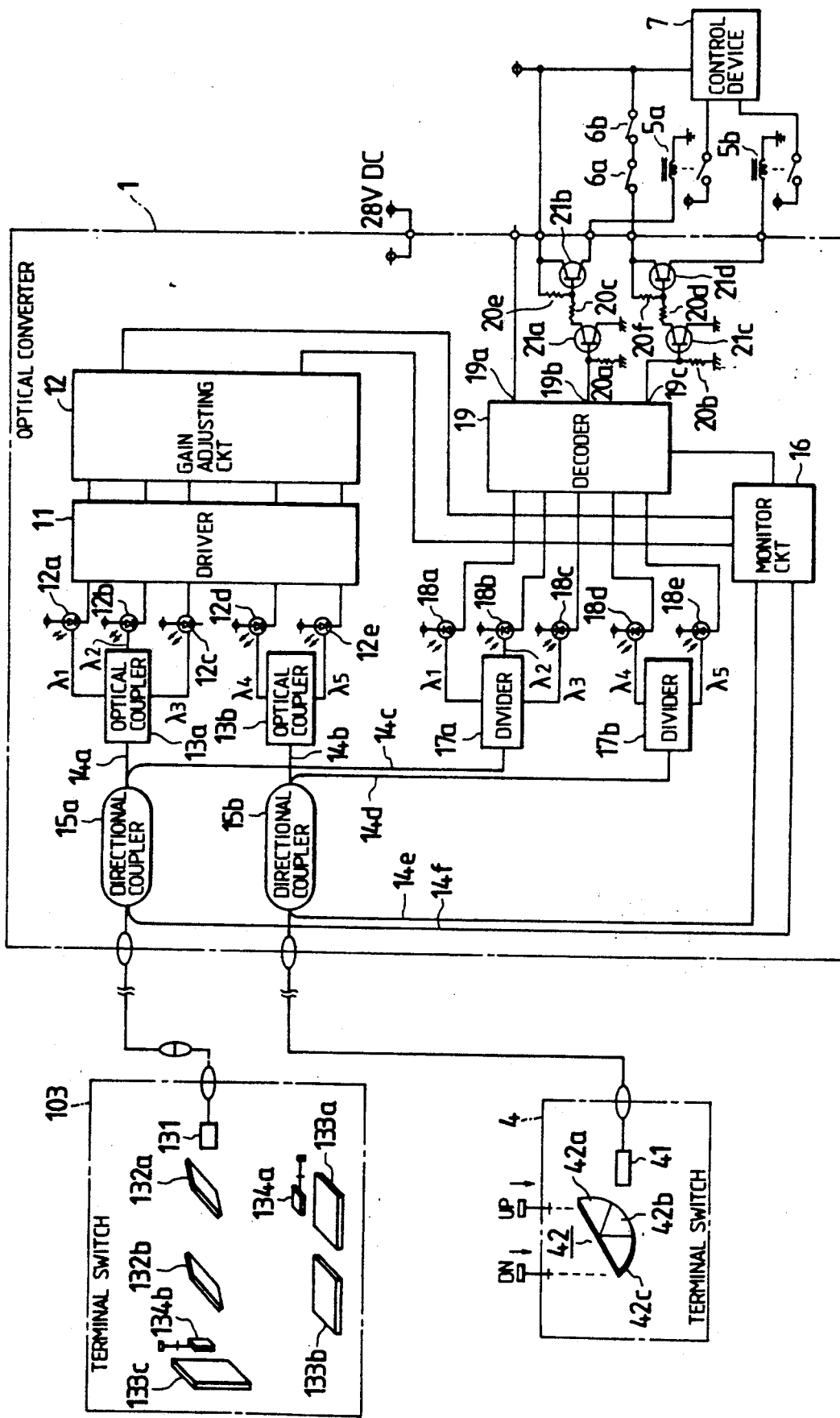
FIG. 10 is a circuit diagram of an optical system to which an optical switch apparatus of a second embodiment of the present invention is applied.

As shown in FIG. 10, light that has been transmitted over the optical fiber cable 14a is launched into a lens 131 in the terminal switch 103, which is a light-converging device. The light is converged by lens 131 and radiated therefrom. At the same time, reflected light is converged by the lens 131 and launched into the optical fiber cable 14a.

The light radiated from lens the 131 of the terminal switch 103 is transmitted to a filter 132a, which reflects only light having a wavelength λ1 and transmits light having other wavelengths. Thus, light having wavelength λ1 is directed toward a reflector 133a, whereas light having other wavelengths is directed toward a filter 132b. Filter 132b reflects only light having a wavelength of λ2 and allows light having a wavelength of λ3 to pass therethrough. Thus, light having a wavelength λ2 is directed toward a reflector 133b, whereas light having a wavelength λ3 is directed toward a reflector 133c. Filters 132a and 132b form a refracting portion that divides light into separate beams according to wavelength and refracts those beams in different directions. Reflectors 133a to 133c are provided in the optical paths of the respective beams, which are reflected by those reflectors to return to the lens 131 through the filters 132a and 132b.

A shutter 134a is provided between the reflector 133a and the filter 132a in such a way that it can be inserted into or removed from the optical path between these two optical devices. A shutter 134b is provided between the reflector 133c and the filter 132b, also in such a way that it can be inserted into or removed from the optical path between these two optical devices. If either shutter is inserted into the optical path at a position where it blocks the light of interest, the light is no longer capable of arriving at the associated reflector and hence will not return to the lens 131. No shutter is provided between the filter 132b and the reflector 133b so that light having a wavelength λ2 is always reflected by the reflector 133b to return to the lens 131.

Figure 14:
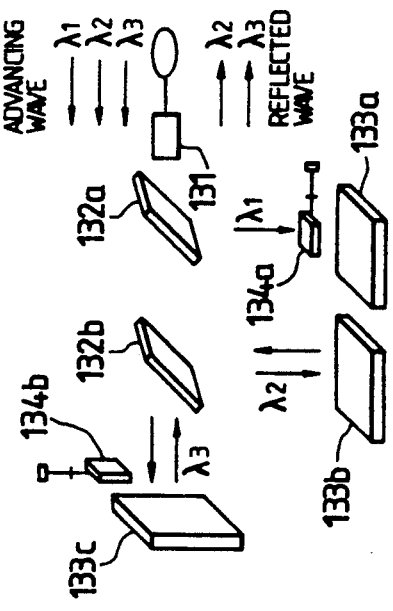

If both shutters 134a and 134b are removed from the optical paths of interest as shown in FIG. 14, light having wavelengths λ1 to λ3 passed through the lens 131 is separated into three different beams by the filters 132a and 132b. The beams having wavelengths λ1, λ2 and λ3 are reflected by the reflectors 133a, 133b and 133c, respectively. The reflected beams reach the lens 131 after passing through the filters 132a and 132b and are converged for launching into the optical fiber cable 14a.

Figure 11:
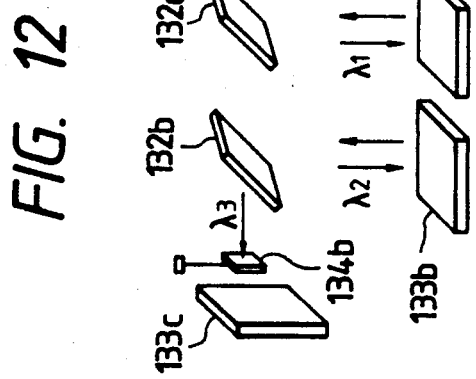
FIGS. 11 to 14 show operational conditions of shutters according to the second embodiment of the invention.
Figure 12:
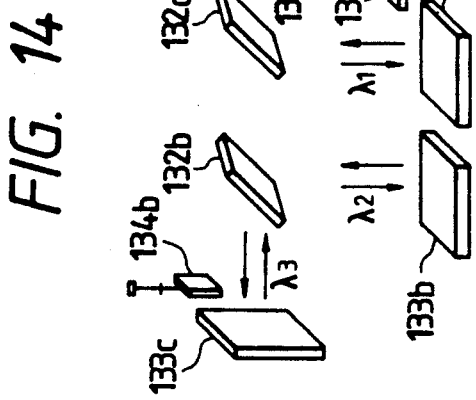
Figure 13:
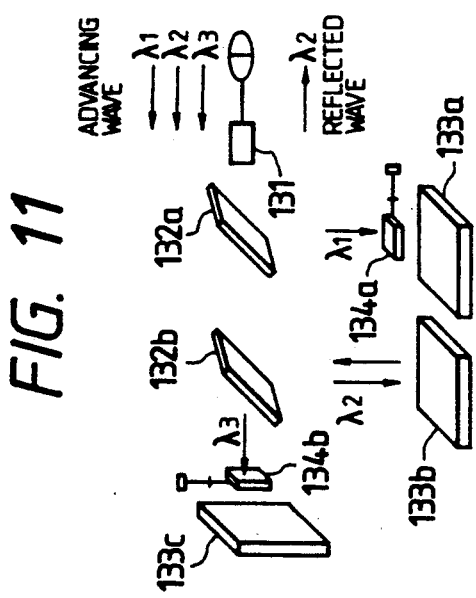

If the shutter 134b is inserted into the optical path as shown in FIG. 12, light at wavelength λ3 is blocked and will not reach reflector 133c. Thus, the only reflected light that is launched into the optical fiber cable 14a is light having wavelengths λ1 and λ2. Similarly, if the shutter 134a is inserted into the optical path as shown in FIG. 13, reflected light at wavelengths λ2 and λ3 is launched into the optical fiber cable 14a. If both shutters 134a and 134b are inserted into the optical paths as shown in FIG. 11, only light having wavelength λ2 is launched into the optical fiber cable 14a.

The operations described above are summarized in Table 3 below.

TABLE 3

| Wavelength detected | Shutter 134a | Shutter 134b |
| --- | --- | --- |
| λ2 | inserted into the optical path | inserted into the optical path |
| λ1 + λ3 | removed from the optical path | inserted into the optical path |
| λ2 + λ3 | inserted into the optical path | removed from the optical path |
| λ1 + λ2 + λ3 | removed from the optical path | removed from the optical path |
| none | optical path | optical path optical fibers broken |

TABLE 3-continued

| Wavelength detected | Shutter 134a | Shutter 134b |
| --- | --- | --- |

The construction of the switch apparatus according to the second embodiment will now be described with reference to FIGS. 8 and 9.

Figure 8:
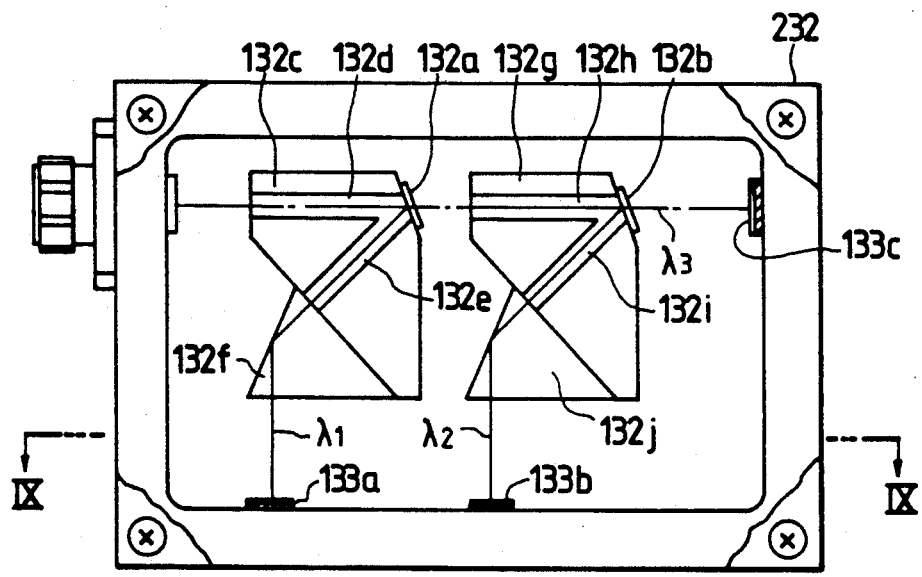
FIG. 8 shows a refracting portion of a reflector according to the second embodiment of the invention.
Figure 9:
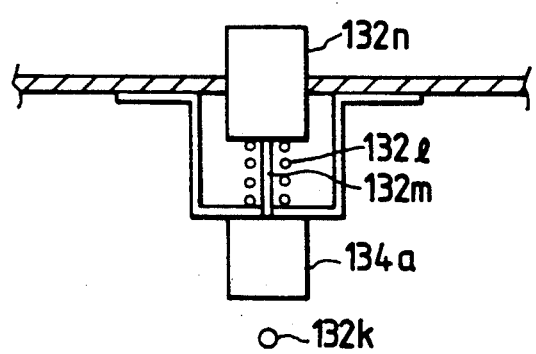
FIG. 9 is a front sectional view showing the reflector.

FIG. 8 shows a refracting portion denoted by 232 which is housed within the terminal switch 3. Light launched into the switch from the left side of FIG. 8 passes through a hole 132d of an ingot 132c and reaches a filter 132a mounted on the oblique rear end of the ingot 132c. Light having a wavelength of λ1 is reflected by the filter 132a and passes through a hole 132e in the ingot 132c to reach a prism 132f. The light having a wavelength λ1 is then refracted by the prism 132f and travels toward the filter 133a mounted on an inside surface of the enclosure.

Light having wavelengths λ2 and λ3 which has passed through the filter 132a passes through a hole 132h in an ingot 132g and reaches a filter 132b. Light having wavelength λ2 is reflected by the filter 132b and passes through a hole 132i in an ingot 132f until it reaches a prism 132j. The light having wavelength λ2 is then refracted by the prism 132j and travels toward the filter 133b mounted on the inside surface of the enclosure. Light having wavelength λ3 passes through the filter 132b and reaches the reflector 133c. The light reflected by each of the filters 133a, 133b and 133c passes along the same path in the return direction.

FIG. 8 shows the terminal switch 3 with the front cover taken away so that shutters 134a and 134b are not seen. The structure of the shutter 134a is shown in FIG. 9, which is a cross section of FIG. 8 taken on a line IX—IX. As shown in FIG. 9, a button 132n is combined integrally with the shutter 134a by means of a connecting member 132m. A spring 132l is inserted into the connecting member 132m and the button 132n, urged by this spring, protrudes beyond the faceplate. In this state, the optical path 132k of light having wavelength λ1 is not interrupted by the shutter 134a. When the button 132n is depressed, the shutter 134a is inserted into the optical path 134k to block light having wavelength λ1. While FIG. 9 shows only that part of the terminal switch 3 which is associated with the movable shutter 134a, it should be understood that a similarly designed shutter 134b is provided between the filter 132b and the reflector 133c.

The embodiments described above are designed to detect not only the operational position of the control switches but also failure of the circuit, since no shutter is provided for the optical path of light having a predetermined wavelength. If it is not necessary to detect circuit failure, this arrangement for enabling reflected light wave to be always present may be omitted. In order to control the extension and retraction of a stairway, light having a plurality of wavelengths is necessary. However, light having only one wavelength will suffice if it is desired to only detect a certain single state.

Hereinbelow, a terminal switch 4 constructed according to the third embodiment of the present invention will now be described in detail with reference to FIGS. 1 and 15–17.

Light having wavelengths λ4 and λ5 transmitted from light-emitting diodes 12d and 12e is radiated from lens 41 toward reflector 42 as in the first and second embodiments. Reflector 42 is composed of sectors of reflecting elements 42a, 42b and 42c which are coupled together at their edges as shown in FIG. 1. Light radiated from the lens 41a will illuminate the major surface of one of reflecting elements 42a to 42c, and the reflected light will return to the lens 41. The reflecting element 42a reflects light having wavelength λ4 and allows light having wavelength λ5 to pass therethrough; the reflecting element 42b reflects both light at λ4 and light at λ5; and reflecting element 42c reflects light having wavelength λ5 and allows light having wavelength λ4 to pass therethrough.

Figure 15:
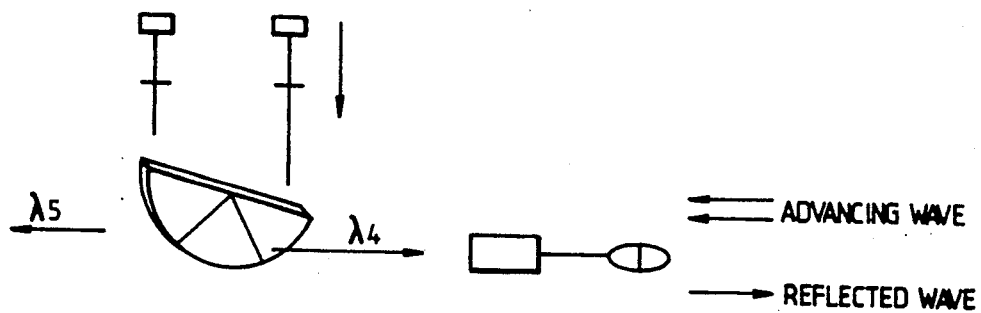
FIGS. 15 to 17 show operational conditions of a reflector unit according to the third embodiment of the invention.
Figure 16:
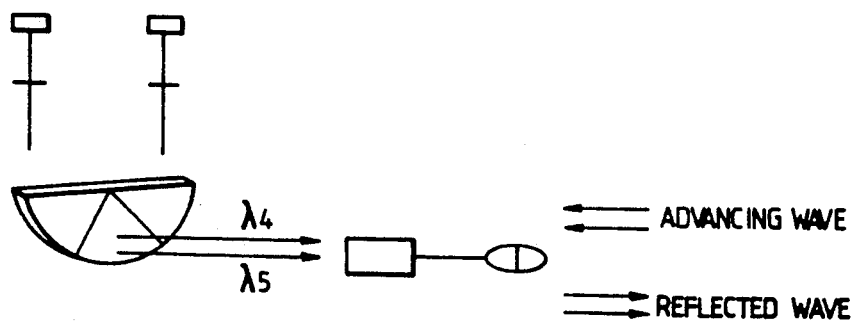
Figure 17:
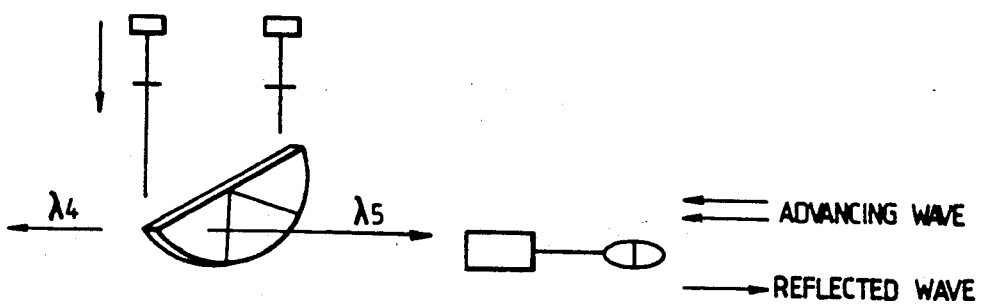

Thus, depending upon the rotational position of the reflector 42, light having different wavelengths is reflected as shown in FIGS. 15 to 17. The reflected light is extracted by directional coupler 15b, divided into separate beams with divider 17b according to wavelength, and detected with light-receiving diodes 18d and 18e. The resulting signals are supplied to the decoder 19, where they are decoded to the position of the terminal switch 4 as summarized below.

TABLE 4

| Wavelength detected | State of terminal switch |
| --- | --- |
| λ4 | as shown in FIG. 15 |
| λ4 + λ5 | as shown in FIG. 16 |
| λ5 | as shown in FIG. 17 |
| none | failure |

Thus, the three different statuses of the terminal switch 4 can be used to control the retraction and extension of a stairway. For example, when a switch apparatus 4' shown in FIG. 6 is depressed on the RETRACT side thereof, the status of the terminal switch 4 is as shown in FIG. 15, when the switch apparatus 4' is in a position "OFF", the status of the terminal switch is as shown in FIG. 16, and when the switch apparatus 4' is depressed on the EXTEND side thereof, the status is as shown in FIG. 17.

As one can see from Tables 1 to 3, the switch apparatus of the present invention is so constructed that light having a certain wavelength is always detected irrespective of the operational status of the terminal switches. Therefore, if a circuit failure due to broken fibers in the optical cable occurs, the circuit failure can be judged by the absence of light of any detectable wavelength detectable.

The decoder 19 is so constructed that it decodes input signals in the way described in Tables 3 and 4. It produces a signal representing a "failure" condition at terminal 19a, a "retract" signal at terminal 19b, and an "extend" signal at terminal 19c. These signals are supplied to the control unit 7, with the "retract" signal passing through transistors 21a and 21b and a relay 5a, and with the "extend" signal passing through transistors 21c and 21d and a relay 5b. The control unit 7 performs mechanical control over the operations of retracting and extending the stairway. The decoder 19 is also supplied with a signal from the monitor circuit so that no output signal will be transmitted if there is any abnormal condition in the optical signal.

In the embodiments described above, the optical signals are assumed to have a constant amplitude. If desired, they may be modulated at low frequency, with output detection signals being supplied through filters. Having a band limiting capability, this technique contributes to a higher S/N ratio and offers the advantage that the switch apparatus can be used in environments where electromagnetic interference is heavy.

In the embodiments described above, two or three different wavelengths are used to control the operations of retracting and extending the stairway. If there are more states to be identified, one only need increase the number of wavelengths to be used.

As described above, the present invention employs merely a single optical fiber cable for transmitting both an advancing wave and a reflected wave, and selection between generation or non-generation of reflected waves is made in accordance with the operational position of a terminal switch. Hence, a particular status of the terminal switch can be detected using merely one optical fiber cable. Therefore, the number of wires which need be included in a harness can be significantly reduced. Further, the use of light having more than one wavelength enables detection of two or more status of the terminal switch. In addition, light having a predetermined wavelength is reflected at all times during the operation of the switch apparatus, which has the added advantage of allowing the detecting of a circuit failure or broken fibers in the optical cable. Since light reflected at the terminal switch is detected, no light source is required at the terminal switch. This eliminates the need for providing a power supply at the terminal switch and the consequent decrease in the number of wires that have to be placed in a harness contributes to a decreased number of steps involved in the installation work and hence to a lower chance of occurrence of errors in the work.

What is claimed is:

1. An optical switch comprising:
   an optical fiber;
   means for producing light having a plurality of predetermined wavelengths and coupling said light to a first end of said optical fiber;
   switch means coupled to a second end of said optical fiber for passing only selected ones of said wavelengths of light received from said light producing means back through said optical fiber and preventing others of said wavelengths of light from being passed back through said optical fiber; and
   means coupled to said first end of said optical fiber for detecting which of said wavelengths of light are received through said optical fiber from said switch means.

2. The optical switch of claim 1, wherein said detecting means comprises means for producing a signal indicating a position of said switch means.

3. The optical switch of claim 1, wherein said light producing means comprises a plurality of light-emitting diodes emitting light of different wavelengths.

4. The optical switch of claim 1, further comprising a direction coupler means coupled to said first end of said optical fiber for coupling light from said light producing means to said first end of said optical fiber and directing light received from said switch means to said detecting means.

5. The optical switch of claim 1, wherein said switch means comprises:
   a light reflector;
   light distributing means coupled to said second end of said optical fiber;
   lens means for converging light received from said light distributing means and directing said light toward said light reflector;

at least one stationary filter for passing light of a first wavelength disposed in a path of light between said lens means and said light reflector; and at least one movable filter selectively disposable in said path of light for passing light of a wavelength different from said first wavelength.

6. The optical switch system of claim 5, wherein said light produced by said light producing means comprises first, second and third wavelengths, said distributing means distributes said light into first and second paths, said lens means comprises first and second lenses, and first and second movable filters are provided, said first lens, said fixed filter and said first filter being disposed in said first path, and said second lens and said second filter being disposed in said second path.

7. The optical switch system of claim 1, wherein said light produced by said light producing means comprises first, second and third wavelengths, and wherein said switch means comprises a first stationary reflector reflecting light of said second wavelength, a first movable reflector reflecting light of said first and second wavelengths, a second stationary reflector reflecting light of said second wavelength, and a second movable reflector reflecting light of said second and third wavelengths.

8. The optical switch system of claim 1, wherein said switch means comprises:
 a lens for converging light received from said second end of said optical fiber;
 at least one filter passing a predetermined wavelength included within said light;
 at least one stationary reflector for reflecting said light; and
 at least one movable shutter disposed in an optical path between said filter and said reflector.

9. The optical switch system of claim 1, wherein said switch means comprises:
 first and second filters;
 first, second and third reflectors; and
 first and second movable shutters,
 said first filter, said first shutter and said first reflector being disposed in a first optical path of light received from said second end of said optical fiber, said first filter, said second filter and said second reflector being disposed in a second optical path of light received from said second end of said optical fiber, and said first filter, said second filter, said second shutter and said third reflector being disposed in a third optical path of light received from said second end of said optical fiber.

10. The optical switch system of claim 9, wherein said light produced by said light producing means includes first, second and third wavelengths, said first filter reflecting said first wavelength into said first optical path and allowing said second and third wavelengths to pass therethrough, and said second filter reflecting said second wavelength into said second optical path and allowing said third wavelength to pass therethrough.

11. The optical switch system of claim 1, wherein said light produced by said light producing means includes first and second wavelengths, and said switch means comprises first, second and third reflecting elements coupled together at their edges.

12. The optical switch system of claim 11, wherein said first reflecting element reflects said first wavelength and allows said second wavelength to pass therethrough, said second reflecting element reflects said first and second wavelengths, and said third reflecting element reflects said second wavelength and allows said first wavelength to pass therethrough.

13. The optical switch system of claim 11, wherein said first second and third reflecting elements have the shape of a sector of a circle.

14. The optical switch system of claim 1, wherein said optical fiber comprises a single fiber.

* * * * *